United States Patent
Jung

(10) Patent No.: US 12,430,862 B2
(45) Date of Patent: Sep. 30, 2025

(54) XR CONTENT CONTROL METHOD AND SYSTEM IN XR CAVE ENVIRONMENT

(71) Applicant: NEWJAK CO.LTD, Naju-si (KR)

(72) Inventor: Hae Hyun Jung, Seoul (KR)

(73) Assignee: NEWJAK CO.LTD, Naju-si (KR)

( * ) Notice: Subject to any disclaimer, the term of this patent is extended or adjusted under 35 U.S.C. 154(b) by 0 days.

(21) Appl. No.: 19/191,559

(22) Filed: Apr. 28, 2025

(65) Prior Publication Data

US 2025/0278904 A1    Sep. 4, 2025

Related U.S. Application Data

(63) Continuation of application No. PCT/KR2023/018160, filed on Nov. 13, 2023.

(30) Foreign Application Priority Data

Nov. 17, 2022   (KR) .................. 10-2022-0154564

(51) Int. Cl.
*G06T 19/00*   (2011.01)
*G06F 3/042*   (2006.01)
(Continued)

(52) U.S. Cl.
CPC .......... *G06T 19/006* (2013.01); *G06F 3/0425* (2013.01); *G06T 7/246* (2017.01);
(Continued)

(58) Field of Classification Search
CPC ...... G06F 3/011; G06F 3/1446; G06T 19/006; G06T 15/00; G06T 7/70; G06T 19/00;
(Continued)

(56) References Cited

U.S. PATENT DOCUMENTS

2016/0098862 A1* 4/2016 Wilson ................. H04N 9/3147
                                                          345/419
2018/0314322 A1* 11/2018 Tseng .................... G06T 19/006
(Continued)

FOREIGN PATENT DOCUMENTS

KR   10-2019-0105532 A   9/2019
KR   10-2021-0023173 A   3/2021
(Continued)

OTHER PUBLICATIONS

Office Action of KIPO, issued on Sep. 15, 2023.
Notice of Allowance of KIPO, issued on May 29, 2024.
International Search Report for PCT/KR2023/018160, Feb. 8, 2024.

Primary Examiner — Xiao M Wu
Assistant Examiner — Scott E Sonners
(74) Attorney, Agent, or Firm — ZION IP; Byungwoong Park

(57) ABSTRACT

A method for controlling XR content in an XR CAVE environment comprising projecting XR content into the XR CAVE, detecting a plurality of pedestrians and calculating the average movement speed and direction using a camera disposed within the XR CAVE, correcting the projection position and speed of the XR content based on the calculated average speed and direction, and projecting the corrected XR content onto the wall(s) of the XR CAVE.

4 Claims, 5 Drawing Sheets

(51) Int. Cl.
*G06T 7/246* (2017.01)
*G06T 11/00* (2006.01)

(52) U.S. Cl.
CPC .... *G06T 11/00* (2013.01); *G06T 2207/20076* (2013.01); *G06T 2207/30196* (2013.01); *G06T 2207/30236* (2013.01)

(58) Field of Classification Search
CPC ..... G06T 15/20; G06T 2215/16; G06T 15/04; G06T 19/003; G06T 2219/024; G06T 15/08; G06T 2200/04; G06T 3/40; G06T 3/08; G06V 20/20; G06V 40/161; G06V 40/23; G06V 40/10; A63F 13/25; A63F 2300/8082
See application file for complete search history.

(56) References Cited

U.S. PATENT DOCUMENTS

2018/0364801 A1 12/2018 Kim et al.
2019/0221043 A1* 7/2019 Kopper .................... A61B 6/03

FOREIGN PATENT DOCUMENTS

| KR | 10-2021-0060888 A | 5/2021 |
| KR | 10-2021-0069419 A | 6/2021 |
| KR | 10-2022-0026140 A | 3/2022 |

* cited by examiner

XR CONTENT CONTROL METHOD AND SYSTEM IN XR CAVE ENVIRONMENT

TECHNICAL FIELD

The present invention relates to a method and system for controlling XR content in an XR CAVE environment. More particularly, it relates to a method and system that enables users to share their fields of view without wearing a Head-Mounted Display (HMD), thereby allowing prolonged immersion in extended reality (XR) through higher resolution and a wider field of view. The invention also allows users to see both their own and others' real bodies, thereby enhancing the sense of presence.

BACKGROUND

Extended Reality (XR) is a comprehensive term that encompasses various immersive and interactive technologies, including Augmented Reality (AR), Mixed Reality (MR), and Virtual Reality (VR). XR has been used in daily life for quite some time and has evolved through various phases since the early 1990s. As interest in the metaverse continues to grow, applications of XR are rapidly expanding into new industries.

In general VR environments, infrared (IR) tracking via HMDs is used to detect the head position and orientation of individual users in real space. However, wearing an HMD not only narrows the field of view but also prevents users from seeing their actual bodies, thereby reducing their sense of presence. In addition, in XR environments where a plurality of users are moving, a technology that adjusts the viewpoint of XR content according to the movement of a plurality of pedestrians is required.

As prior art, Korean Publication Patent No. 10-2019-0105532 (titled "XR Content Providing Method and XR Device") discloses a method that includes generating estimated user movement information based on one or more coordinate systems and the coordinate system of the XR device, acquiring images in front of the XR device, separating the acquired images into a first image and a second image, generating transformed movement information based on at least one of the images, correcting the estimated user movement information using the transformed movement information, and displaying XR content at the position and orientation indicated by the corrected movement information. However, this approach does not address the limitations of HMDs in shared XR environments.

SUMMARY

Technical Problems

The present invention aims to provide a method and system for controlling XR content in an XR CAVE environment, which enables users to share their fields of view without wearing an HMD. This allows prolonged immersion in XR through higher resolution and a wider field of view. Moreover, it allows users to see their own and others' physical bodies, thereby achieving a heightened sense of presence.

Effect of Invention

According to the present invention, users can immerse themselves in XR content for extended periods without wearing an HMD, enjoying higher resolution and a wider field of view. Additionally, because users are not required to wear an HMD, they can see their own and others' actual bodies, which provides a heightened sense of presence.

DETAILED DESCRIPTION

The embodiments disclosed in this specification are presented solely for illustrative purposes to describe the concept of the invention. The invention may be implemented in various forms and is not limited to the specific embodiments described herein.

The embodiments according to the concept of the invention may be modified in various ways and can take diverse forms. Thus, the drawings and detailed descriptions herein are provided to fully disclose preferred examples and are not intended to limit the scope of the invention. All modifications, equivalents, or alternatives falling within the spirit and scope of the invention are included.

The terminology used in this specification is for the purpose of explaining specific embodiments only and is not intended to limit the invention. Unless clearly stated otherwise, singular forms also include the plural. Expressions such as "comprise" or "have" are intended to denote the presence of stated features, numbers, steps, operations, elements, components, or combinations thereof, and do not preclude the presence or addition of one or more other features, numbers, steps, operations, elements, components, or combinations thereof.

The embodiments described in this specification are merely illustrative of the concept of the invention and are not intended to limit the invention to any particular structural or functional configuration. The embodiments may be implemented in various forms and are not limited to those described herein.

Modifications and variations can be made in accordance with the concept of the invention, and thus the drawings and descriptions are provided in detail to illustrate preferred examples. However, they are not intended to limit the invention to any specific form of disclosure, and all changes, equivalents, and alternatives falling within the spirit and scope of the invention are encompassed.

The terms used in this specification are for the purpose of describing particular embodiments only and are not intended to limit the invention. Unless otherwise specified, singular forms include the plural. Expressions such as "comprise" or "have" are intended to indicate the presence of stated features, numbers, steps, operations, elements, or components, but do not preclude the presence or addition of one or more other features or components.

Hereinafter, embodiments of the invention will be described in detail with reference to the attached drawings.

Figure 1:
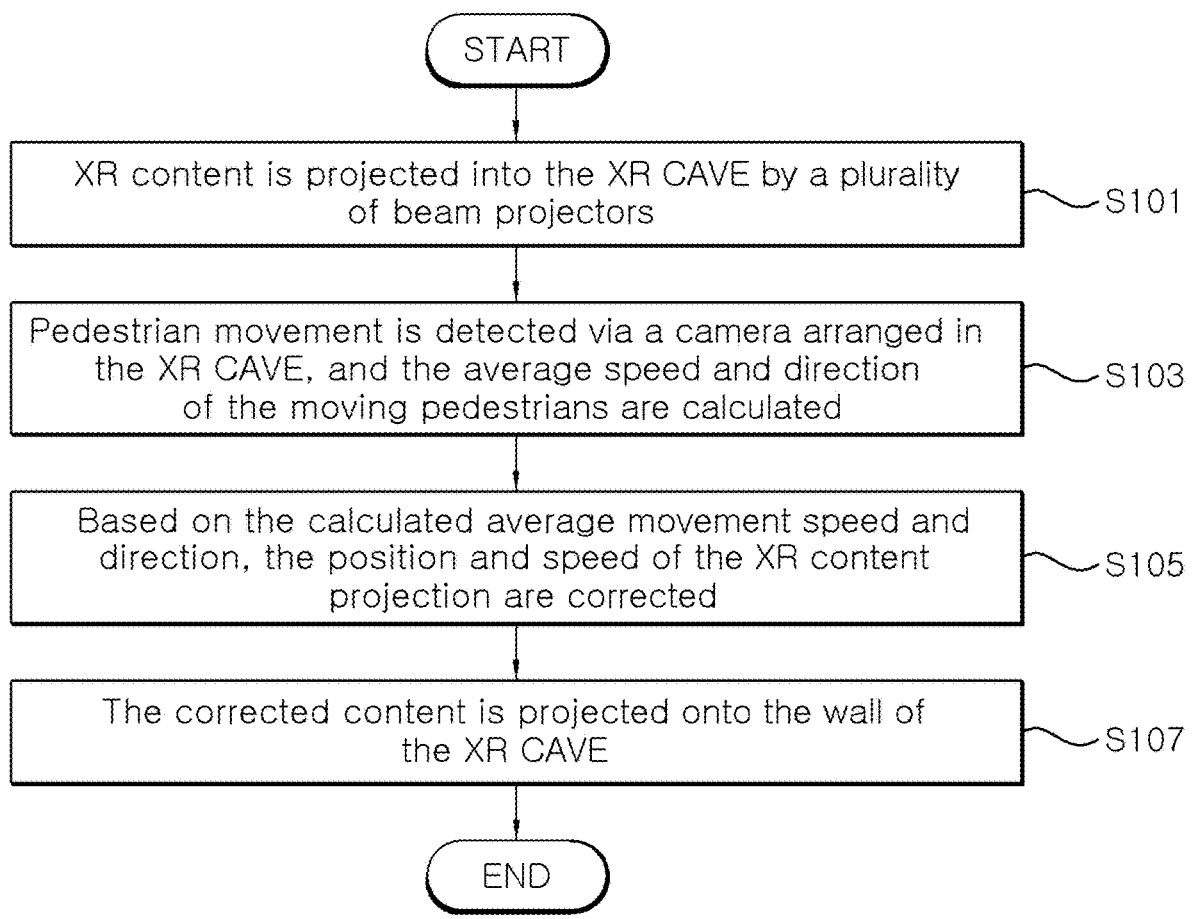
FIG. 1 is a flowchart illustrating the XR content control method in an XR CAVE environment according to an embodiment of the present invention.

FIG. 1 is a flowchart illustrating an XR content control method in an XR CAVE environment according to an embodiment of the present invention. Referring to FIG. 1, XR content is projected into the XR CAVE (100) by a plurality of beam projectors (220) (S101). The projected content may be the initial, uncorrected XR content detected before any pedestrian movement is observed.

This initial XR content may be generated based on a database of spatial and user information collectable within the XR CAVE (200), or based on technical characteristics of XR content available in the XR CAVE (200).

Pedestrian movement is detected via a camera (210) arranged in the XR CAVE, and the average speed and direction of the moving pedestrians are calculated (S103). The camera (210) may be a single unit capable of capturing videos of a plurality of pedestrians. Without the use of infrared or depth cameras, it can estimate the movement paths and walking directions of individuals. Based on the calculated average movement speed and direction, the position and speed of the XR content projection are corrected (S105), and the corrected content is projected onto the wall(s) (230) of the XR CAVE (S107). The wall(s) (230) may consist of one or more surfaces and may be configured in various forms, including a belt shape or a rectangular structure. In some cases, conductive ink may be used to link the wall(s) to a touchboard, enabling interactive control through pedestrian touch.

Figure 2:
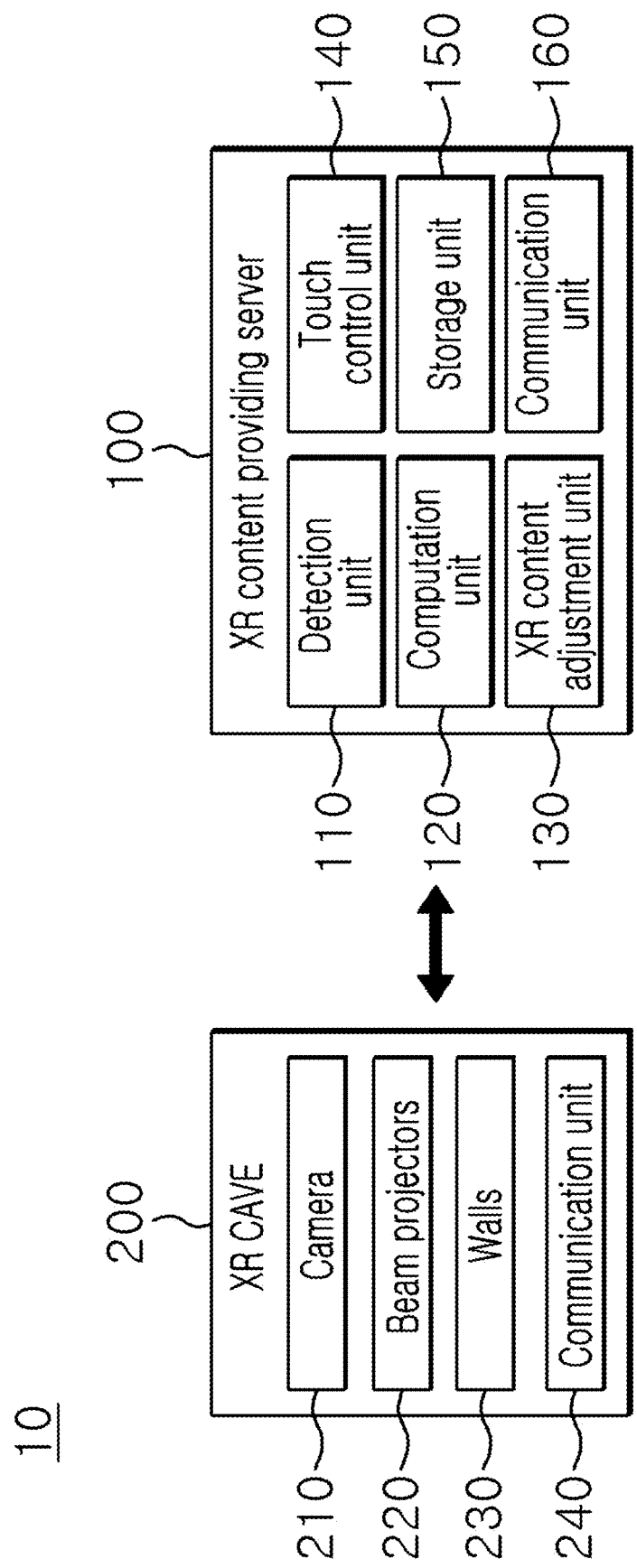
FIG. 2 is a flowchart illustrating a method of detecting a plurality of pedestrians according to an embodiment of the present invention.
Figure 3:
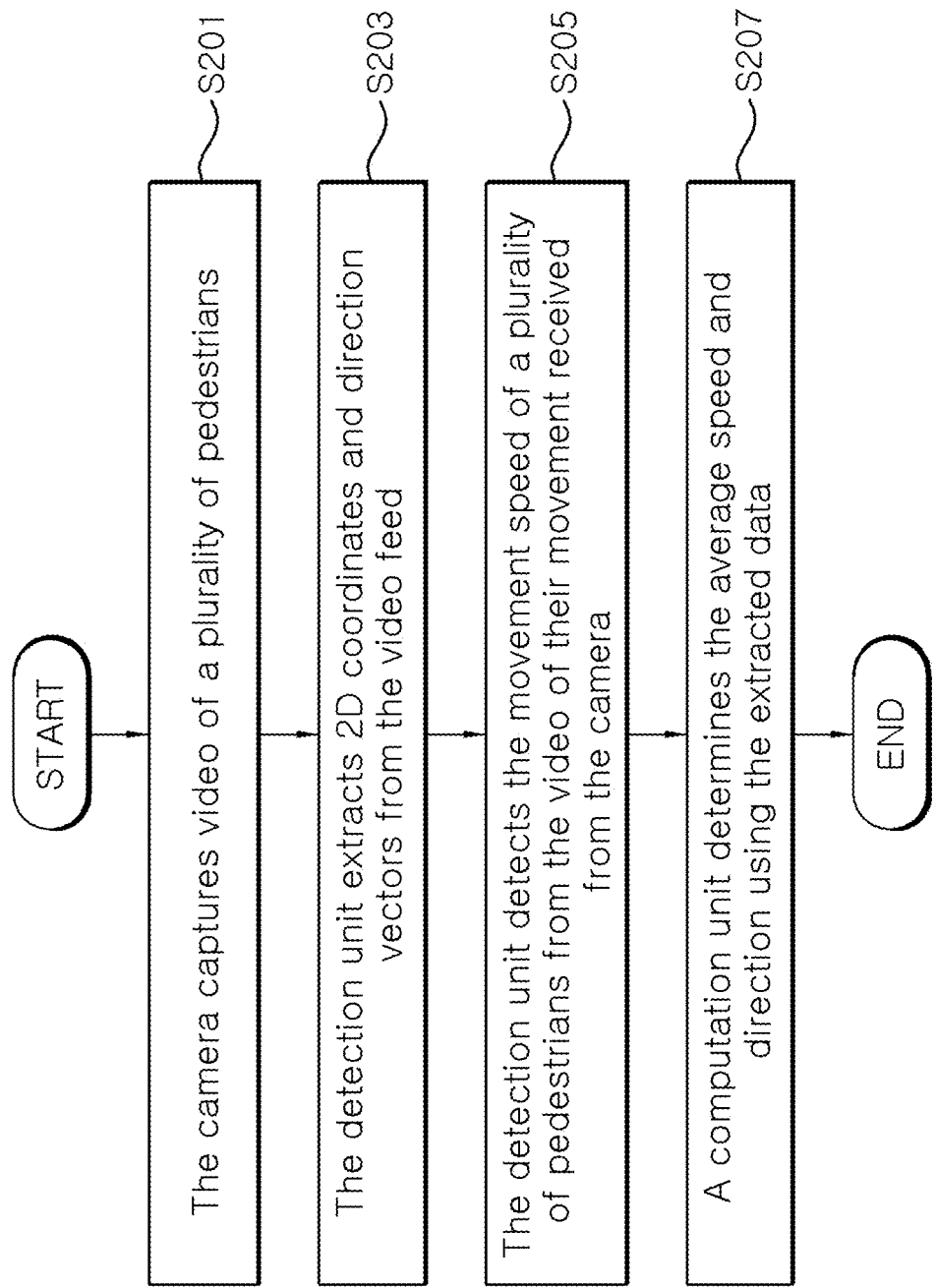
FIG. 3 is a block diagram illustrating the XR content control system in an XR CAVE environment according to an embodiment of the present invention.

FIG. 2 is a flowchart illustrating the method of detecting a plurality of pedestrians according to an embodiment of the invention. The camera (210) captures video (S201), and a detection unit (110) extracts 2D coordinates and direction vectors from the video feed (S203). This is done by mapping the movement variation of the pedestrians onto a 2D plane relative to the center of the video frame.

Rather than tracking all coordinates, the detection unit may track only characteristic areas. The unit also detects the movement speed of individual pedestrians based on the movement video received from the camera (S205), and a computation unit (120) determines the average speed and direction using the extracted data (S207). This allows real-time correction of XR content based on the average movement of pedestrians.

Since Head-Mounted Displays (HMDs) are not used, the XR CAVE environment must recognize the direction of pedestrian movement by identifying the user's position in physical space. The detection unit (110) employs vision-based tracking, providing broad compatibility and versatility. It tracks dynamically changing 2D coordinates of a plurality of pedestrians in real time from the video feed received from the camera (210).

The detection unit (110) may map the positional variation of pedestrians projected onto a 2D image plane relative to the center of the video frame, converting this variation into angular values. Instead of tracking all coordinate areas of the pedestrians, the system may track only characteristic areas such as edges or points with significant pixel changes, though not limited thereto.

Using the tracked 2D coordinates, the detection unit (110) estimates direction vectors and movement speeds. This may involve estimating 3D coordinates within the XR CAVE environment based on the video feed to derive more accurate direction vectors and speeds.

The computation unit (120) calculates the average speed of the pedestrians based on the direction vectors and movement speeds detected by the detection unit (110). Since many pedestrians may be moving in real time, the computation unit may calculate the average of individual movement speeds to adjust the speed of the XR content accordingly.

If the corrected XR content speed differs significantly from the average pedestrian speed, it may cause disorientation and reduce immersion. Therefore, the computation unit (120) should calculate and maintain the error rate within an acceptable threshold-preferably less than 5%, though not limited thereto.

The computation unit (120) also calculates a common direction for the group of pedestrians based on the direction vectors. If there is a high variance among direction vectors due to a large number of pedestrians, it calculates a directional average within an acceptable error threshold, preferably less than 10%.

The XR content adjustment unit (130) corrects the projection position and speed of the XR content based on the calculated average speed and direction of the pedestrians.

For example, if the average walking speed is calculated to be 8 km/h, the system may determine that pedestrians are jogging and adjust the XR content's progress speed accordingly. Conversely, if the average speed is below 0.2 km/h, it may infer that the users are nearly stationary and slow the XR content accordingly.

The XR content adjustment unit (130) may also receive correction requests from the touch control unit (140), and adjust the projection parameters based on these requests. The touch control unit (140) receives interactions from the walls (230) of the XR CAVE. These interactions represent pedestrian-initiated touches that trigger responses in the XR content.

Based on such interactions, the touch control unit (140) can request adjustments to the XR content from the adjustment unit (130).

The storage unit (150) stores the initial uncorrected XR content that exists prior to detecting pedestrian movement. This content may be created from spatial and user information collected within the XR CAVE (200), or through analysis of technical attributes of XR content suitable for the environment.

To enhance immersion, the initial XR content may include sound logos that auditory encode data into short sound clips to reflect unique features of a space or product. When pedestrians approach the vicinity of a location where a sound logo is configured, the system may trigger its playback. This auditory cue enables users to associate the sound with specific content or areas, enhancing spatial immersion.

The communication unit (160) handles networking and data exchange within the XR CAVE (200). The communication may be based on CDMA, HSDPA, IEEE 802.16x ultra-high-speed wireless internet, IEEE 802.11x WLAN, or any other network technology.

The XR CAVE (200) comprises the camera (210), beam projectors (220), walls (230), and a communication unit (240). The camera (210) may be a single unit that captures the movement of a plurality of pedestrians without relying on infrared or depth cameras. It may be installed above the XR CAVE environment and be used for collecting data and training machine learning models based on pedestrian movement.

The XR content providing server (100) may receive data from the XR CAVE (200) through the communication network.

The beam projector(s) (220) may be configured with one or more units. In an embodiment using a plurality of projectors, multi-surface projection mapping techniques can be employed to provide interactive media over a wide area, enabling a plurality of pedestrians to simultaneously experience the XR content.

By projecting XR content onto the a plurality of wall surfaces (230), the system can create an immersive environment that allows active and vivid user interaction.

The wall(s) (230) may consist of one or more panels. For example, a single wall may form a belt-shaped XR CAVE (200), or four walls may form a rectangular structure. However, the invention is not limited to these configurations.

One or more walls (230) may be connected to touchboards using conductive ink. When a pedestrian touches a wall, the interaction may be recognized and transmitted to the touch control unit (140).

The wall (230) may utilize conductive ink that enables electric connectivity even in non-conductive areas. Additionally, the wall can be connected to Unity software using serial communication, enabling interaction execution based on serial input values. Sensitivity settings can be adjusted to enable touch even through thicker wall materials.

The communication unit (240) allows each component of the XR content providing server (100) to communicate via a network. This network may include, but is not limited to, CDMA or HSDPA-based mobile communication, IEEE 802.16x ultra-high-speed wireless Internet, and IEEE 802.11x WLAN.

FIG. 4 illustrates configurations of the wall structures within the XR CAVE in different embodiments.

Figure 4B:
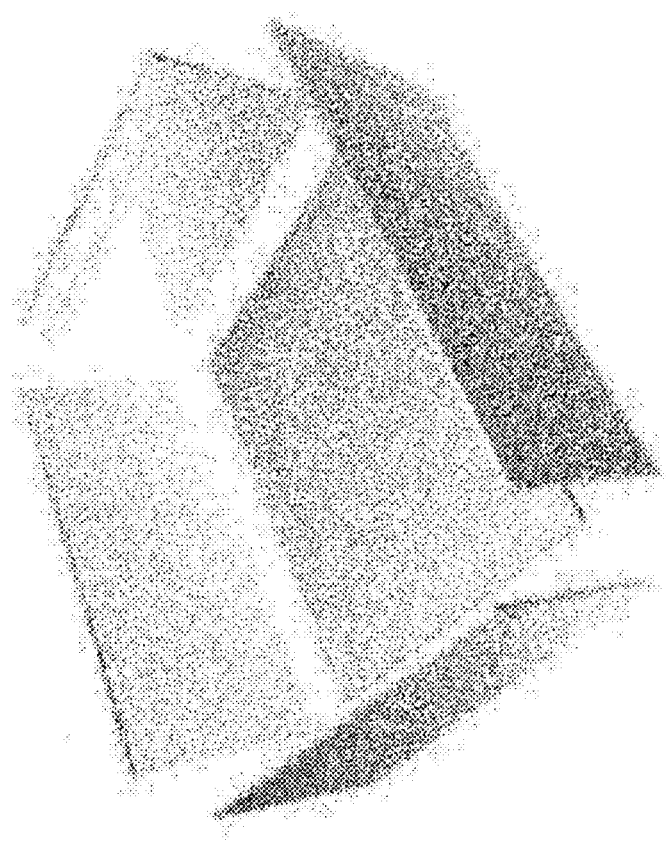
FIGS. 4A and 4B are block diagrams illustrating the structure of the walls of the XR CAVE according to an embodiment of the present invention.
Figure 4A:
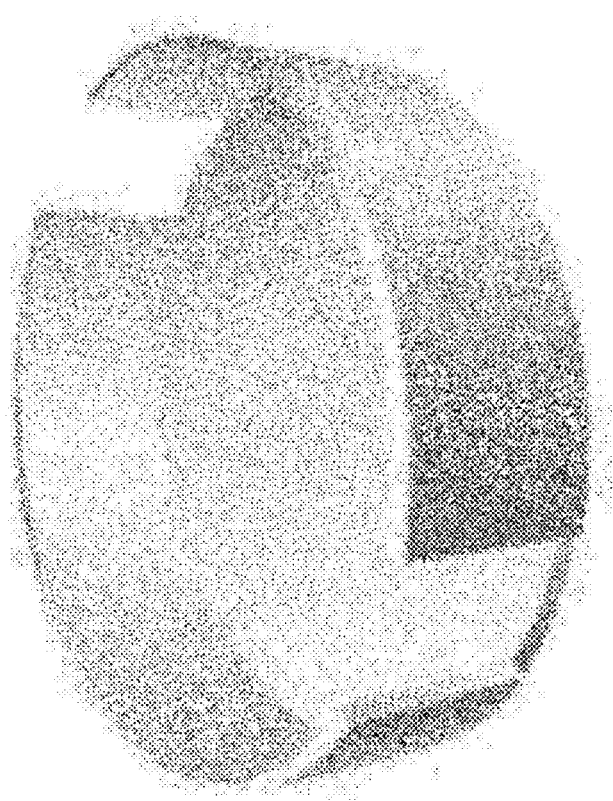

FIG. 4A shows a single wall forming a belt shape, FIG. 4B shows four walls forming a rectangular structure. Additional walls may be added as needed, depending on the content being projected.

Figure 5B:
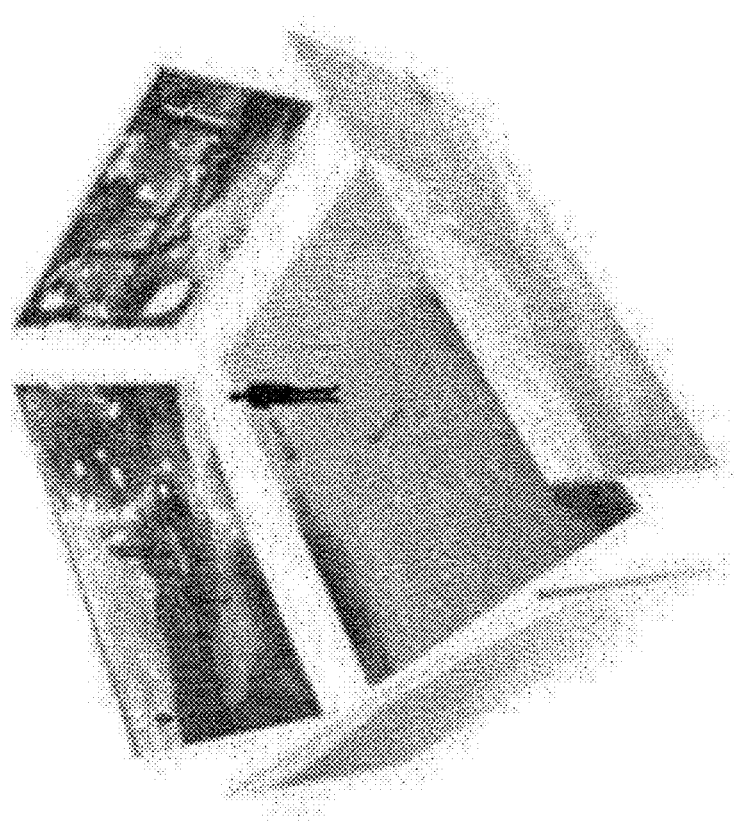
FIGS. 5A and 5B are illustrative diagrams showing the walls of the XR CAVE onto which XR content is projected according to an embodiment of the present invention.
Figure 5A:
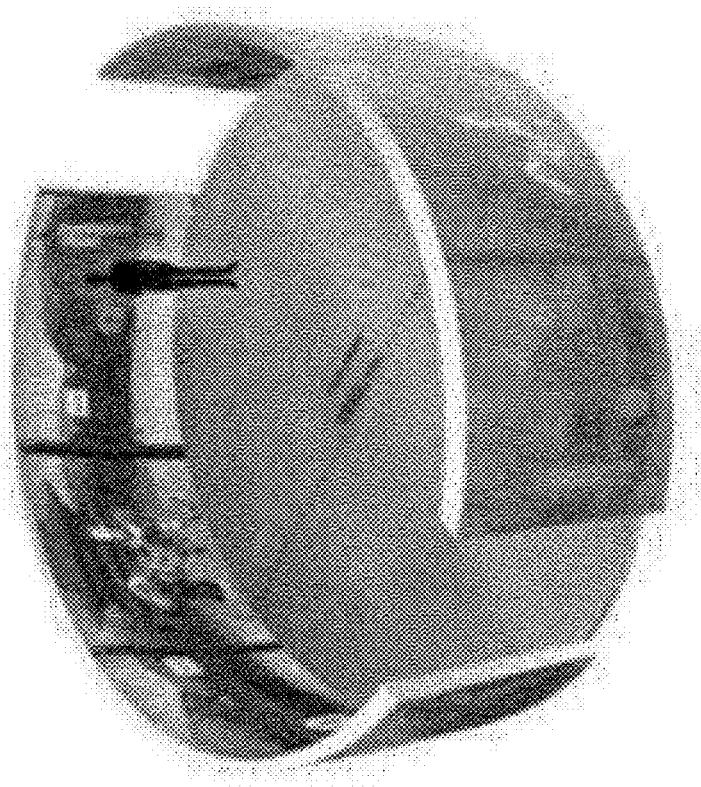

FIG. 5 shows an example of XR content being projected onto the XR CAVE walls:

FIG. 5A shows XR content is projected on a belt-shaped wall (230), FIG. 5B shows XR content is projected on four wall panels forming a rectangular structure.

As shown in FIG. 5, one or more pedestrians may walk through and experience the projected XR content interactively within the XR CAVE.

Although the invention has been described with reference to specific embodiments shown in the figures, it will be understood by those skilled in the art that various modifications and equivalent embodiments are possible. Therefore, the true scope of protection for this invention should be determined by the technical spirit of the appended claims.

What is claimed is:

1. A method for controlling XR content in an XR CAVE environment, the method comprising:
    projecting XR content into the XR CAVE;
    detecting a plurality of pedestrians and calculating an average movement speed and direction using a camera disposed within the XR CAVE;
    correcting a projection position and speed of the XR content based on the calculated average movement speed and direction; and
    projecting the corrected XR content onto a wall of the XR CAVE;
    wherein the step of detecting the plurality of pedestrians and calculating the average movement speed and direction comprises:
    capturing video of the plurality of pedestrians using the camera;
    tracking two-dimensional coordinates and extracting direction vectors from the captured video using a detection unit;
    detecting the movement speeds of the plurality of pedestrians based on the captured video; and
    calculating the average movement speed and direction based on the tracked coordinates and extracted direction vectors using a computation unit.

2. The method of claim 1, wherein the camera that captures the movement video of the plurality of pedestrians is a single camera.

3. The method of claim 1, wherein the wall of the XR CAVE constitutes a part of the XR CAVE structure and is configured to be linked to a touch board, such that XR content is controllable via user touch input.

4. An XR content control system in an XR CAVE environment, comprising:
    an XR content providing server configured to:
    receive movement video of a plurality of pedestrians captured by a camera;
    detect the plurality of pedestrians and calculate an average movement speed and direction of the plurality of pedestrians;
    correct an irradiation position and speed of XR content based on the calculated average movement speed and direction; and
    irradiate the corrected XR content onto a wall of the XR CAVE;
    the XR CAVE configured to:
    capture movement video of the plurality of pedestrians using the camera; and
    irradiate XR content onto a wall of the XR CAVE,
    wherein the XR content providing server comprises a detection unit,
    the detection unit configured to:
    extract two-dimensional (2D) coordinates and direction vectors from the movement video received from the camera;
    detect movement speeds of the plurality of pedestrians based on the received movement video; and
    provide the extracted coordinates, direction vectors, and movement speeds to a computation unit,
    wherein the computation unit calculates an average movement speed and direction of the plurality of pedestrians using the provided data.

* * * * *